Sept. 30, 1969    C. GOODACRE    3,469,858
VEHICLE DIFFERENTIAL STEERING MECHANISMS
Filed Jan. 2, 1968    3 Sheets-Sheet 1

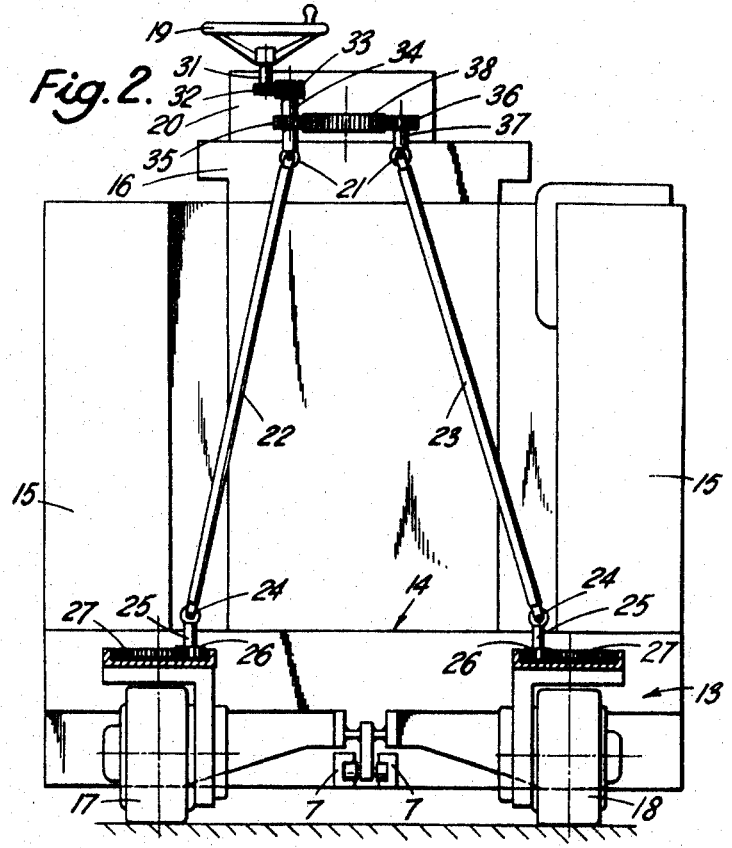
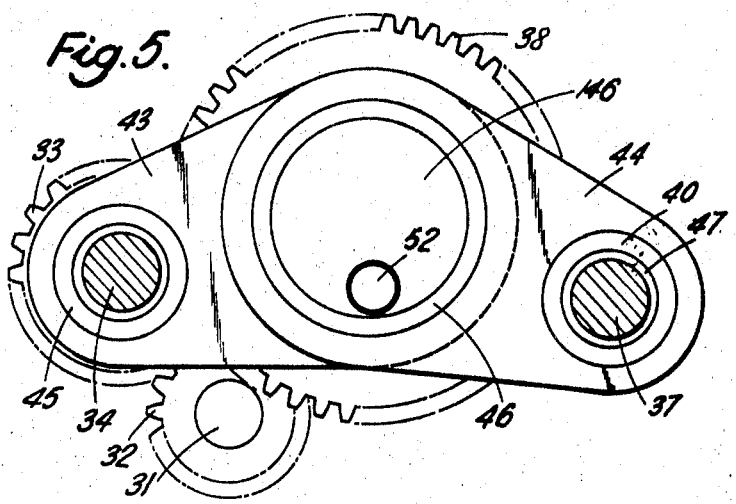

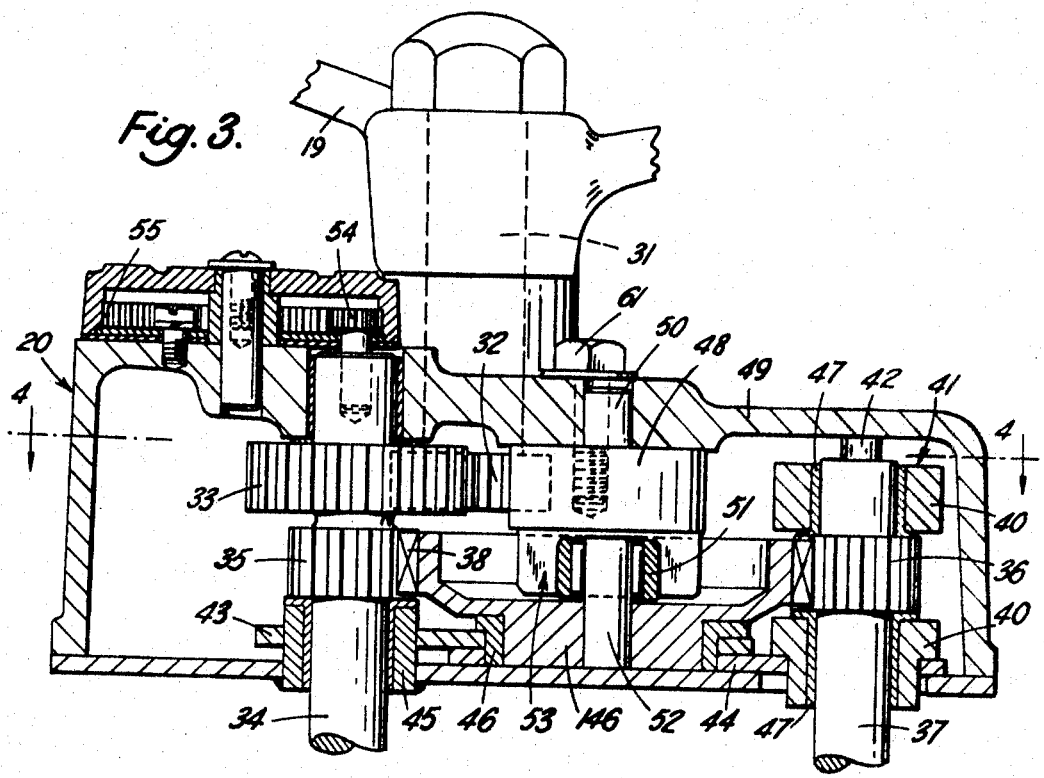
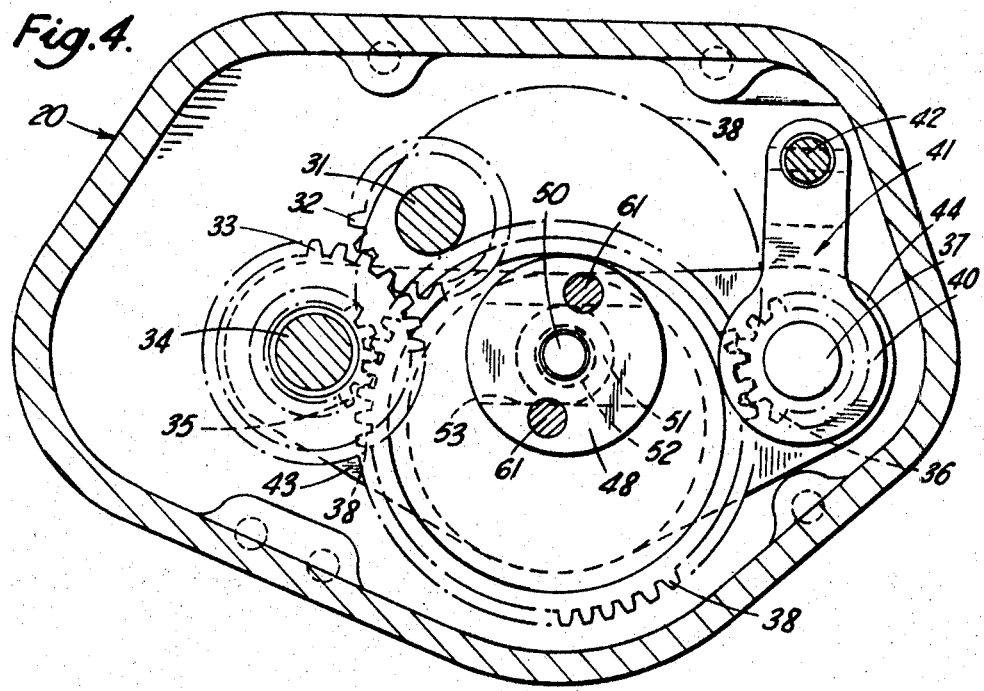

United States Patent Office 3,469,858
Patented Sept. 30, 1969

3,469,858
VEHICLE DIFFERENTIAL STEERING MECHANISMS
Cecil Goodacre, Basingstoke, England, assignor to Lansing Bagnall Limited, Basingstoke, Hampshire, England, a British company
Filed Jan. 2, 1968, Ser. No. 695,104
Claims priority, application Great Britain, Jan. 4, 1967, 479/67
Int. Cl. B62d 1/20, 3/02; B60p 1/02
U.S. Cl. 280—93         12 Claims

ABSTRACT OF THE DISCLOSURE

A vehicle, e.g., an industrial lift truck is provided with two steerable ground wheels spaced apart across the vehicle, each ground wheel being rotatable by gearing connected by a universal joint to one end of a propeller shaft, propeller shafts extending upwardly and preferably inwardly and being connected by further universal joints at their upper ends to further gearing, the said further gearing associated with each propeller shaft being rotatable by means of a hand wheel and being connected together by a differential mechanism.

---

This invention relates to vehicle differential steering mechanisms and vehicles provided with such mechanisms.

According to the invention a vehicle is provided with two steerable ground wheels spaced apart across the vehicle, each ground wheel being rotatable by gearing connected by a universal joint to one end of a propeller shaft, the propeller shafts extending upwardly and being connected by further universal joints at their upper ends to further gearing, the said further gearing associated with each propeller shaft being rotatable by means of a hand wheel and being connected together by a differential mechanism.

The propeller shafts may also extend inwardly, the upper ends of the propeller shafts thereby being closer together than the lower ends.

In one form of the invention the differential mechanism comprises an intermediate gear wheel which meshes with a gear wheel of each said further gearing, the intermediate gear wheel having means which cause its centre point to move laterally between the gear wheels which mesh therewith when the intermediate gear wheel is rotated, which means comprise a sliding connection between the intermediate gear wheel and a fixed member, the said connection being offset from the centre point of the intermediate gear wheel whereby the intermediate gear wheel will effect a differential action between the gear wheels which mesh therewith.

The said sliding connection preferably comprises a roller or like member upstanding from the intermediate gear wheel for engagement in a slot or groove provided in the said fixed member, the roller or like member sliding along the slot or groove during rotation of the intermediate gear wheel and said sliding movement of the roller or like member effecting the lateral movement of the intermediate gear wheel.

Preferably the said gear wheels which mesh with the intermediate gear wheel are of equal size and are smaller than the intermediate gear wheel.

The hand wheel is preferably connected in driving relation with one of the gear wheels which mesh with the intermediate gear wheel.

The vehicle is preferably an industrial lift truck. In this case, it is advantageous that the upwardly and preferably inwardly extending propeller shafts position the differential mechanism at a substantial distance above the ground wheels. The arrangement is thereby such that no steering mechanism extends between the ground wheels or in a horizontal plane immediately above them.

The invention also includes a vehicle differential steering mechanism as described above.

By way of example, a specific embodiment in accordance with the invention will now be described with reference to the accompanying drawings in which:

FIGURE 2 is a diagrammatic elevation of the steering mechanism forming part of the truck shown in FIGURE 1;

FIGURE 3 is an enlarged sectional elevation of the gear box of the steering mechanism shown in FIGURE 1;

FIGURE 4 is a section along the line 4—4 in FIGURE 3; and

FIGURE 5 is an underplan of the gear box of the steering mechanism shown in FIGURE 1, the casing of the gear box being removed.

Figure 1:
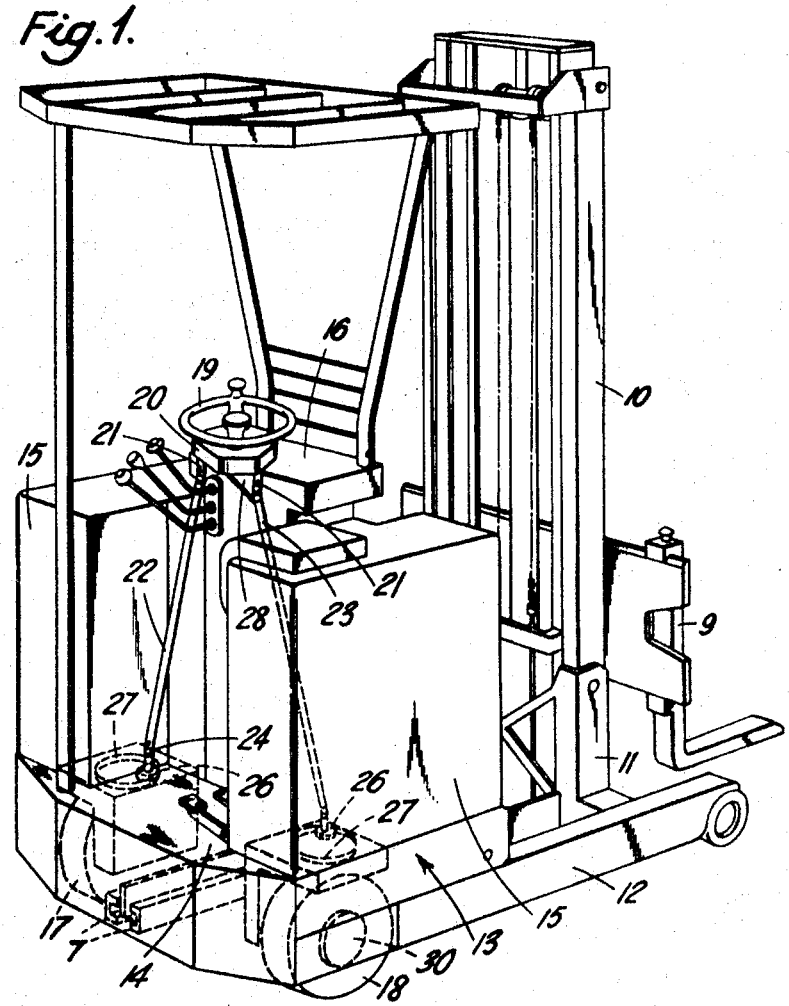
FIGURE 1 is a perspective view of an industrial lift truck incorporating a differential steering mechanism is accordance with the invention.

With reference to FIGURE 1, there is shown an industrial lift truck having an extensible mast 10 mounted on a reach carriage 11 which is capable of horizontal movement along front guides provided by straddle legs 12 (only one of which is shown) and a third rear guide 7 extending centrally beneath the floor of the body portion 13 of the truck. A load lifting fork carriage 9 is mounted for up and down movement on the mast. The truck is also provided with an operator platform 14 between two electric storage battery units 15 and behind a hydraulic power unit 16 for operating the various movements of the mast and the carriage. Beneath the floor of the body portion of the truck, there are two steerable ground wheels 17, 18 each of which may be driven by an electric motor mounted within the hub 30 of the respective wheel and supplied with current from the battery units 15. The ground wheels are also spaced apart across the width of the truck, one on either side of the central rear guide 7 for the reach carriage 11. This invention relates to a steering mechanism connecting a hand steering wheel 19 for the operator to the steerable ground wheels 17, 18, a specific embodiment of which will be described below. Therefore, although, in this example, the steering mechanism is described in relation to an industrial reach truck, the invention is no way limited thereto and the steering mechanism may readily be applied to other vehicles.

With reference to the drawings, the above-mentioned steering mechanism comprises the steering wheel 19 connected by means of a gear box 20 (described in detail below) and universal joints 21 to the upper ends of two propeller shafts 22, 23. Rotation of the steering wheel will thereby effect rotation of both propeller shafts. Mounted by means of a universal joint 24 on the lower end of each of the propeller shafts 22, 23, there is a shaft 25 carrying a pinion 26, which shaft 25 is rotatable by the respective propeller shaft about a fixed vertical axis. The said universal joints 21, 24 allow the propeller shafts 22, 23 to extend upwardly and inwardly between the shafts 25 and the gear box 20. Also, each of the pinions 26 meshes with an internally toothed ring gear 27 forming a part of the mounting of one of the ground wheels 17, 18, the respective ground wheel thereby being rotated or steered by the ring gear in the same direction of rotation as that of the associated pinion and propeller shaft. Both the propeller shafts 22, 23 are rotated by the gear box in the same direction and thereby both the ground wheels will be steered in the same direction.

The gear box 20 is located above the upper ends of the propeller shafts and, in this example, is supported partly on the top surface of the hydraulic power unit 16 and partly on a bracket 28 projecting rearwardly from the rear surface of the hydraulic power unit.

The construction of the gear box 20 (see FIGURES 2 to 5) will now be described. The steering wheel 19 directly rotates a shaft 31 carrying a gear wheel 32. This gear wheel 32 is in mesh with another gear wheel 33 carried by a parallel shaft 34 which also carries a further gear wheel 35 and which shaft is connected by means of the aforesaid universal joint 21 to the propeller shaft 22. The gear wheel 35 is employed to simultaneously drive the other propeller shaft 23, the gear wheel 35 being in driving relation with a complementary gear wheel 36 carried by a shaft 37 connected by means of the other universal joint 21 to the propeller shaft 23, the drive from the gear wheel 35 to the gear wheel 36 being transmitted by a larger intermediate gear wheel 38. The vertical axis of the shaft 34 is fixed, but, for the purpose described below, the bearings 47 for the shaft 37 which carries the gear wheel 36 are provided by the arms 40 of a forked link 41 carried by a parallel spindle 42 pivotal about a fixed axis and mounted in bearings provided in the casing of the gear box. The shaft 37, and hence the gear wheel 36, is thus able to pivot about the axis of the spindle 42. Link members 43, 44 (see FIGURES 3 to 5) are also provided for retaining these gear wheels 35, 38, 36 in mesh with each other, the member 43 surrounding a fixed bearing 45 for the shaft 34 and supporting a bearing 46 housing the boss 146 of the intermediate gear wheel 38, and the member 44 surrounding the said bearing 46 for the boss 146 of the intermediate gear wheel 38 and the lower bearing 47 for the shaft 37. The bearing 46 is a press-fit in the link member 43. As shown in FIGURES 4 and 5, the link members 43, 44 locate the intermediate gear wheel 38 in a position in which its centre point is offset from the line joining the centre points of the gear wheels 35, 36. In this example, the smaller angle between the longitudinal axes of the link members 43, 44 is 150°, the larger angle thus being 210°. When the intermediate gear wheel 38 is in its position shown in full lines in FIGURES 4 and 5, the ground wheels 17, 18 of the truck are in their straight-ahead positions. The manner in which the intermediate gear wheel is moved to its chain-line position (FIGURE 4) and the result that is effected by such movement is described below.

Mounted above the intermediate gear wheel 38, there is an upturned channel member 48 located with respect to the top wall 49 of the gear box 20 by a dowel pin 50, and fixed thereto by bolts 61. The particular location of the channel member 48 is such that the groove or slot 53 defined by the channel member is directed along the line which joins the centre points of the gear wheels 35, 36. In engagement with this groove 53, is a roller or like member 51 carried by a pin 52 upstanding from the boss 146 of the intermediate gear wheel 38, the said roller and groove forming a sliding connection between the intermediate gear wheel and the stationary casing of the gear box. The roller 51 is also offset from the centre point of the intermediate gear wheel 38 and, when the intermediate gear wheel is in its full-line position, i.e., when the ground wheels of the truck are in their straight-ahead positions, or when the intermediate gear wheel is in its chain-line position, i.e., when the ground wheels of the truck are in their full-lock positions in either direction, the roller 51 is located centrally of the groove 53 and is equidistant between the gear wheels 35, 36.

In operation, rotation of the intermediate gear wheel 38, which is effected by rotation of the gear wheel 35, will cause the roller 51 to slide along the groove 53 and the centre point of the intermediate gear wheel 38 to move in an arcuate path about the axis of the shaft 34 from its full-line position towards its chain-line position (FIGURE 4). The direction of movement of the roller 51 along the groove 53 will depend on the directions of rotation of the gear wheels 35, 38, 36. Assuming first that the gear wheel 35 is rotated in a clockwise direction (as viewed in FIGURE 4), the intermediate gear wheel 38 will be rotated in an anticlockwise direction. The gear wheel 36 is rotated by the intermediate gear wheel in a clockwise direction and hence in the same direction of rotation as the driving gear wheel 35, which is necessary, in this example, to ensure that both ground wheels 17, 18 are steered in the same direction. Simultaneously, the roller 51 will move along the groove 53 to the left, as viewed in FIGURE 4, and, as stated above, the intermediate gear wheel will be moved towards its chain-line position. The intermediate gear wheel 38 will reach its chain-line position after it has been rotated through 180°, during which movement, the roller 51 will have moved to the left-hand end of the groove 53 and will have returned to its initial central position. Such movement of the intermediate gear wheel through 180° represents movement of the ground wheels 17, 18 of the truck to their full-lock positions in one direction, i.e. that direction which corresponds with clockwise rotation of the gear wheels 35, 36 and hence clockwise rotation of the propeller shafts 22, 23. Also, due to the differential action of the intermediate gear wheel 38, the gear wheel 35, and hence the ground wheel 17, will have rotation through a smaller angle than the gear wheel 36 and the corresponding ground wheel 18, the ratio of the rotary movements of the gear wheels 35, 36 being the same as the ratio of the aforesaid smaller and larger angles between the axes of the link members 43, 44. Thus for clockwise rotation of the gear wheels 35, 36 the ratio of the rotary movements is 75:105.

On the other hand, assuming that the intermediate gear wheel 38 is again in its full-line position, rotation of the gear wheel 35 in an anticlockwise direction, as viewed in FIGURE 4, will effect rotation of the intermediate gear wheel 38 in a clockwise direction and rotation of the gear wheel 36 in an anticlockwise direction. Hence, this time, the roller 51 will move along the groove 53 to the right, as viewed in FIGURE 4. After the intermediate gear wheel 38 has reached its chain-line position, i.e., rotated through 180°, and the roller 51 has moved to the right-hand end of the groove and returned to its initial central position, the ground wheels 17, 18 will have been moved to their full-lock positions corresponding to anticlockwise rotation of the gear wheels 35, 36 and the ratio of the rotary movements of the gear wheels 35, 36 and hence of the corresponding ground wheels 17, 18 will be 105:75. The desired steering movements of the ground wheels 17, 18 will thus be maintained in both directions of rotary movement of the gear wheels 35, 36.

During the above described movement of the intermediate gear wheel, i.e., laterally with respect to the gear wheels 35, 36 the link members 43, 44 will pivot with respect to each other about the bearing 46 of the intermediate gear wheel and the link member 44 will cause the gear wheel 36 to pivot about the axis of the spindle 42 towards the gear wheel 35. Such movement of the gear wheel 36, which is effected by the link 44, ensures that the gear wheels 36, 38 remain in mesh throughout the arcuate movement of the intermediate gear wheel about the centre point of the gear wheel 35.

In the case of the gear arrangement described above and shown in the drawings, the direction of rotation of the gear wheels 35, 36 (and hence the ground wheels 17, 18) will be the opposite of that of the direction of rotation of the steering wheel 19. If it is desired that the ground wheels should be rotated in the same direction as that of the steering wheel, an idler gear is introduced between the gear wheels 32, 33 to reverse the direction of rotation of the gear wheels 35, 36 and hence of the ground wheels.

With reference to FIGURE 3, the upper end of the shaft 34 carries a pinion 54 which meshes with an internally toothed ring gear 55 mounted for rotation on the top surface of the gear box 20. On the top surface of this ring gear 35 and rotatable therewith, there is an indicator which shows the relative position of the ground wheels 17, 18 relative to their straight-ahead position. The indicator thus acts as a device which is visible to the operator of the truck to indicate the direction in which the ground wheels are pointing at any specific time.

Referring again to FIGURE 1, the steering mechanism comprises two basic sections, each section being associated with one of the ground wheels 17, 18 and located towards one side of the truck. The intermediate gear wheel 38 connecting the two sections together is also located between the upper ends of the propeller shafts 22, 23 and the steering wheel 19 and is thus spaced a substantial distance above the ground wheels. The arrangement of the mechanism thereby provides a relatively large, substantially triangular space for reception of other parts of the truck, i.e., in this example, the space is able to house the rear guide 7 for the reach carriage 11.

Another advantage of the mechanism described above is that since the differential part of the mechanism is provided in an upper portion of the truck, there is no steering mechanism extending between the ground wheels at a lower level. Hence the operator platform, which normally has to be above any such mechanism, can be positioned closer to the ground, thus reducing operator fatigue.

A further advantage is that the inwardly extending propeller shaft allow the overall size of the differential part of the mechanism to be kept to a minimum, especially the proportion of the width of the truck over which the mechanism extends.

I claim:

1. A vehicle having two steerable ground wheels spaced apart across the vehicle, each ground wheel being rotatable by gearing connected by a universal joint to one end of a propeller shaft, the propeller shafts extending upwardly and being connected by further universal joints at their upper ends to further gearing, the said further gearing associated with each propeller shaft being rotatable by means of a hand wheel and being connected together by a differential mechanism.

2. A vehicle as claimed in claim 1 in which the propeller shafts also extend inwardly, the upper ends of the propeller shafts thereby being closer together than the lower ends.

3. A vehicle as claimed in claim 1 in which the differential mechanism comprises an intermediate gear wheel which meshes with a gear wheel of each said further gearing, the intermediate gear wheel having means which cause its centre point to move laterally between the gear wheels which mesh therewith when the intermediate gear wheel is rotated, which means comprise a sliding connection between the intermediate gear wheel and a fixed member, the said connection being offset from the centre point of the intermediate gear wheel whereby the intermediate gear wheel will effect a differential action between the gear wheels which mesh therewith.

4. A vehicle as claimed in claim 3 in which the sliding connection causes the centre point of the intermediate gear wheel to move in an arcuate path about the axis of one of the gear wheels which mesh therewith and in which further means are provided for retaining the intermediate gear wheel in mesh with the said other gear wheel during movement of the intermediate gear wheel along the arcuate path.

5. A vehicle as claimed in claim 4 in which a rigid link connects a part which moves in fixed relation with the intermediate gear wheel and a part which is movable in fixed relation with the said other gear wheel.

6. A vehicle as claimed in claim 4 in which a rigid link is provided for positively precluding lateral movement of the intermediate gear wheel other than along the said arcuate path.

7. A vehicle as claimed in claim 3 in which the said sliding connection comprises a roller upstanding from the intermediate gear wheel for engagement in a groove provided in the said fixed member, the roller sliding along the groove during rotation of the intermediate gear wheel and said sliding movement of the roller effecting the lateral movement of the intermediate gear wheel.

8. A vehicle as claimed in claim 3 in which the said sliding connection is reciprocal along the line joining the centre points of the gear wheels which mesh with the intermediate gear wheel and in which the centre point of the intermediate gear wheel is offset from the said line, the direction of said offset being in one direction when the steerable ground wheels of the vehicle are in their straight-ahead positions and in the other direction when the steerable ground wheels are in their full-lock positions.

9. A vehicle as claimed in claim 3 in which the said gear wheels mesh with the intermediate gear wheel are of equal size and are smaller than the intermediate gear wheel.

10. A vehicle as claimed in claim 4 in which the hand wheel is connected in driving relation with the said gear wheel about whose axis moves the centre point of the intermediate gear wheel during rotation of the intermediate gear wheel.

11. A vehicle as claimed in claim 1 in which the vehicle is an industrial lift truck and in which the upwardly extending propeller shafts position the differential mechanism at a substantial distance above the ground wheels.

12. A differential steering mechanism for use in a vehicle as claimed in claim 1.

References Cited

UNITED STATES PATENTS

| | | | |
|---|---|---|---|
| 2,834,605 | 5/1958 | McCollough | 280—91 |
| 3,130,981 | 4/1964 | Christenson et al. | 280—93 |
| 3,140,101 | 7/1964 | Sheppard | 280—91 |
| 3,189,366 | 6/1965 | Ulinski | 280—93 |

KENNETH H. BETTS, Primary Examiner

U.S. Cl. X.R.

74—498